Feb. 3, 1942.  R. B. BOURNE  2,271,892
SOUND ATTENUATING DEVICE
Filed July 15, 1936  2 Sheets-Sheet 1

INVENTOR
ROLAND B. BOURNE
BY Clapin + Neal
ATTORNEYS

Feb. 3, 1942. R. B. BOURNE 2,271,892
SOUND ATTENUATING DEVICE
Filed July 15, 1936 2 Sheets-Sheet 2
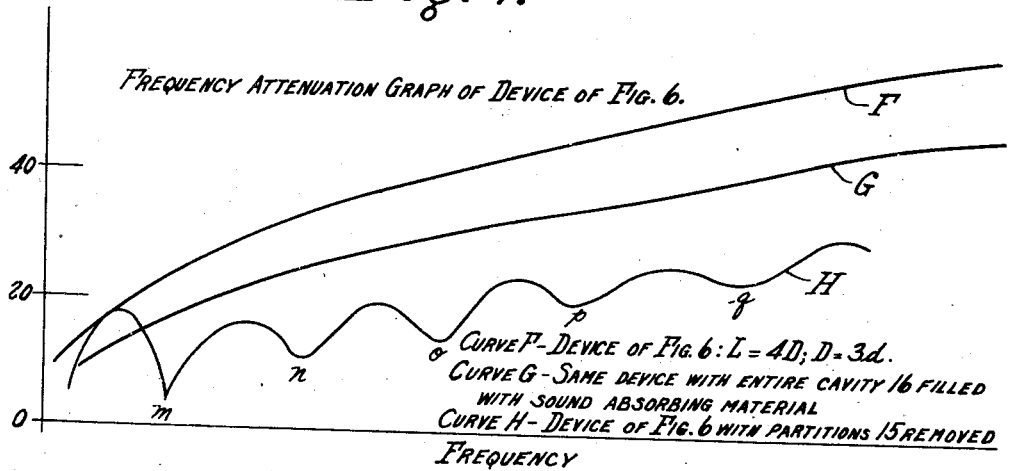
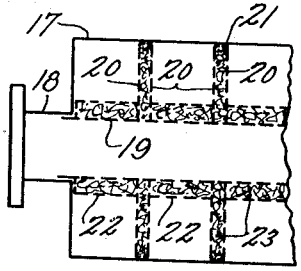
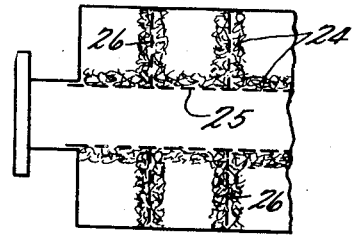
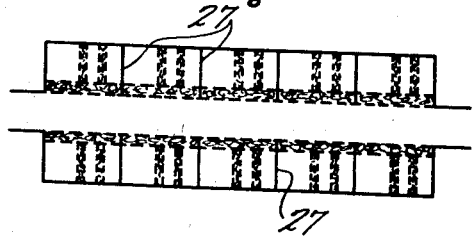
INVENTOR
ROLAND B. BOURNE
BY
Chapin & Neal
ATTORNEYS Patented Feb. 3, 1942

2,271,892

UNITED STATES PATENT OFFICE 2,271,892

SOUND ATTENUATING DEVICE

Roland B. Bourne, Hartford, Conn., assignor to The Maxim Silencer Company, Hartford, Conn., a corporation of Connecticut Application July 15, 1936, Serial No. 90,662

29 Claims. (Cl. 181—48)

The present invention describes certain improvements which I have effected in sound attenuating devices such as may be used in connection with noisy engine exhausts, air compressor intakes and the like. In particular, I refer to the devices described and shown in my U. S. Patent No. 2,043,731, wherein wholly novel attenuation vs. frequency characteristics are disclosed.

In general, the devices shown in that patent comprise an unobstructed main sound and gas conducting channel to which is acoustically coupled one or more acoustic sidebranches, each sidebranch consisting of an acoustic resistance and inertance, formed by a body of sound absorbing material, in series with a closed cavity. As is shown in the above named patent, this type of acoustic silencing device may be designed to offer a very uniform amount of attenuation to sound waves over a wide frequency range.

It is a prime purpose of the present invention to disclose how the attenuation over the effective frequency range of the device may be greatly improved.

It is another purpose of the invention to show how the deleterious effects of undesired resonances in the sidebranches may be avoided with no loss in attenuation at any frequency.

Further purposes and objects are disclosed as the specification proceeds.

In the above named patent, the various embodiments of the invention all are capable of showing, to a certain degree, loss of attenuation at frequencies for which the length of the sidebranch, measured in a direction parallel to the main sound channel, is some integral multiple of a half wavelength. For such sound frequencies, these vibrations may properly be considered as parasitic oscillations which interfere with the proper functioning of the device. In order to do away with these parasitic oscillations, with their resulting loss in attenuation for the device as a whole, I resorted in said patent to the use of short sections whereby the lowest longitudinal resonance took place at a sufficiently high frequency as to be of no practical importance. This resulted however, in the raising of the so-called "cut-off" frequency of the device, with a resulting loss of attenuation at low frequencies, together with an increase in the number of transverse solid headers, thus increasing the weight and cost of the device. In the present invention, I completely eliminate the bad effects of parasitic resonances in the sidebranch by the use of sound absorbing material placed at points of high acoustic velocity for such parasitic vibrations.

Referring to the drawings,

Fig. 7 shows graphs germane to Fig. 6;

Figs. 8 and 9 show constructional details; and

Fig. 10 shows a further embodiment of the invention.

Figure 1:
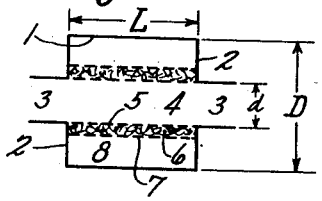
Fig. 1 shows a device after the manner of those in the above named patent.
Figure 2:
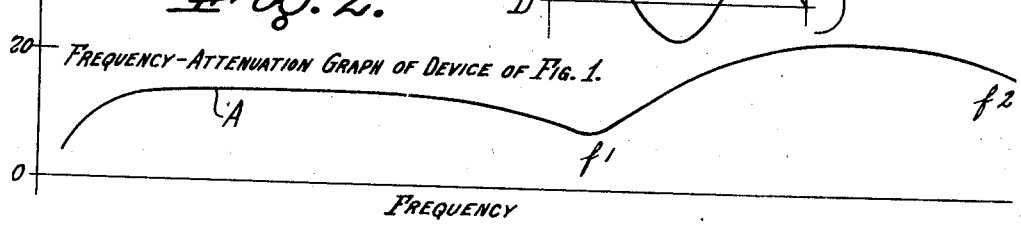
Fig. 2 shows a graph germane to Fig. 1.

The device of Fig. 1, which is presented for comparison purposes and represents a typical construction shown in the above named patent, comprises a casing 1, end headers 2 having inlet and outlet openings 3, and a main sound conducting channel 4 extending from one of said openings to the other and formed by the perforate tube 5. Surrounding the tube 5 is a relatively thin layer of sound absorbing material 6 confined between said tube 5 and an outer perforate metal tube 7 whereby sound waves occurring in the main channel 4 may flow through the body of sound absorbing material 6 into the closed cavity 8 formed by the shell 1, the end headers 2, and the outer perforate tube 7. This device functions in the manner described in the patent referred to. It is substantially like one section of the silencer shown in Fig. 2 of that patent, the length of the side-branch being equal to its diameter and to three times the diameter of the main channel. Its frequency-attenuation characteristic is shown by curve A in Fig. 2 of the present case; this being generally proportional to curve A of Fig. 10 of the patent except for differences due to the change from four sections to one and to a variation in the sound absorbing materials which were used in experimentally determining the graphs in the two cases. The curve is obtained by measuring the insertion loss in decibels when the device is inserted in a long acoustic line. The dips in the attenuation curve at points $f_1$ and $f_2$ are at those sound frequencies for which the length L is equal to one-half wavelength and one wavelength respectively.

Figure 3:
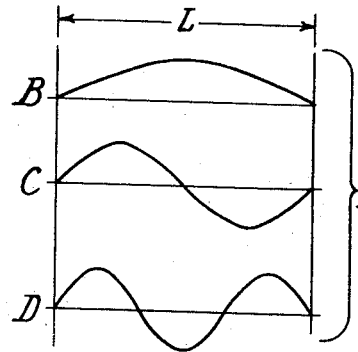
Fig. 3 shows graphs illustrative of oscillations in the sidebranch in a direction parallel to the main channel.

Fig. 3 shows graphs depicting, in conventional manner, the first three modes of vibration in the closed cavity in a direction parallel to the main channel. The gravest mode, or fundamental shown in curve B is for the condition that velocity minima occur at both ends and a region of high acoustic velocity occurs in the central portion. The first overtone, or second harmonic, is shown in curve C. It is seen that velocity minima occur at both ends and in the middle, while velocity maxima occur at points distant one quarter from either end. The third harmonic condition is shown by curve D. Other harmonics can be depicted in the same manner. In order to suppress a standing wave system of a given type in the most efficient manner and without seriously interfering with oscillations in other planes, I propose to insert a pervious layer of sound absorbing material at regions of high acoustic velocity, rather than in regions of high pressure changes, such as at the solid boundary wall of a cavity. A pervious partition of sound absorbing material inserted mid-way along the length of a resonator of the linear type, closed at both ends, will provide sufficiently high damping to prevent the fundamental frequency and all odd harmonics of the standing wave system from being set up. Inspection of curve C, Fig. 3, shows that a pervious partition of sound absorbing material positioned at a region one fourth of the distance along the length thereof will be effective in preventing the second harmonic from being set up. In many cases, higher harmonics than the third are sufficiently enfeebled by the total amount of dissipation present to be of no practical importance. If desired, partitions may be readily disposed to attenuate any given frequency or overtone to which the sidebranch may be resonant. In practice, I have found that two partitions are generally sufficient to give ample protection against loss of attenuation due to these parasitic oscillations. The use of too many sound absorbing partitions in a given length introduces too much dissipation into the cavity as a whole and the attenuation at medium and low sound frequencies suffers as a consequence. This condition is analogous to that fully discussed in relation to Fig. 4 of the above named patent.

Figure 4:
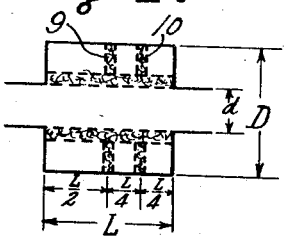
Fig. 4 shows an embodiment of the present invention.
Figure 5:
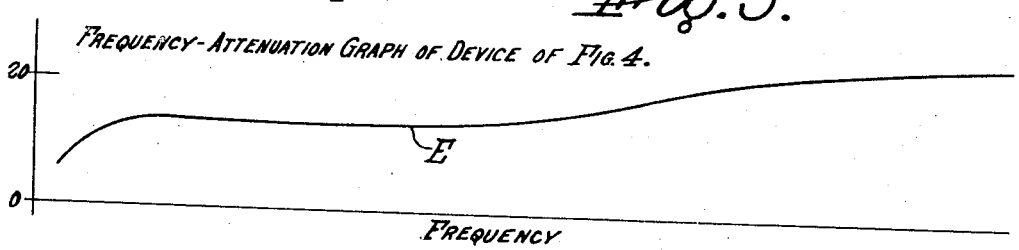
Fig. 5 shows a graph germane to Fig. 4.

Fig. 4 of the present case shows a form of my invention comprising a single sidebranch acoustically coupled to the main sound conducting channel. It is the device of Fig. 1 with pervious transverse sound absorbing partitions 9 and 10 disposed at the one half and one quarter points respectively. The partitions of only sufficient thickness to obliterate the dips $f_1$ and $f_2$ in the frequency vs. attenuation curve due to parasitic oscillations in the sidebranch in a direction parallel to the main channel. Curve E of Fig. 5 shows a graph taken with the device of Fig. 4. It is to be noted that the net effect of the partitions 9 and 10 is to remove the dips at $f_1$ and $f_2$ without affecting the attenuation at other frequencies, particularly at the low frequency end of the sound spectrum.

Figure 6:
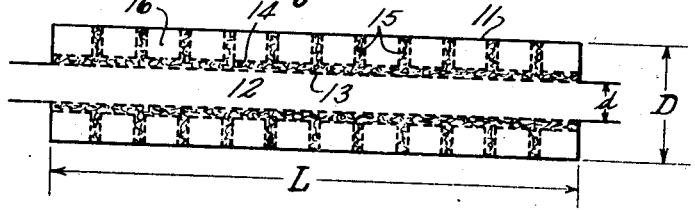
Fig. 6 shows another embodiment of the invention.

Fig. 6 shows a sound attenuating device in which the sidebranch has a relatively great length compared to its diameter. As pointed out in the above named patent, maximum attenuation per section per unit length is obtained for devices of this character by the use of short sections. I show this embodiment of the prevent invention to further demonstrate how transverse partitions of sound absorbing material positioned in an annular sidebranch are effective in eliminating loss of attenuation due to longitudinal parasitic oscillations even in comparatively long sections. It comprises a casing 11, and a main channel 12 formed by a perforate tube 13, surrounding which is a relatively thin body of sound absorbing material 14. A plurality of pervious partitions of sound absorbing material 15 are positioned across the closed cavity 16. Silencers of this type are suitable for those services where the sound energy is largely concentrated in relatively high frequencies and where the expense of using a number of solid steel partitions is not justified. Increased low frequency response, if desired, can be obtained in the manner to be described in connection with Fig. 10. The device lends itself to cheap and easy construction, since there are no solid headers to be welded into place. The central perforated tube 13 and its associated bodies of sound absorbing material may be fabricated independently of the outer shell and inserted therein as a unit. Even the perforate tube 13 may be omitted if a suitable self-supporting sound absorbing material is used. In Fig. 7, curve F shows the frequency-attenuation characteristic of the device of Fig. 6 for the condition that $L=4D$ and $D=3d$. Curve G shows how the attenuation suffers when the entire cavity 16 is filled with sound absorbing material, and corresponds generally with curve C of Fig. 10 of the patent referred to. Removal of the partitions 15 results in the characteristic shown by curve F, and is analogous to curve F of Fig. 11 of the patent. The dips at points $m$, $n$, $o$, $p$, and $q$ are due to longitudinal resonance phenomena in the cavity 16. The improvement in silencing ability due to my invention is obvious.

Fig. 8 shows constructional details pertaining to one embodiment of the invention. An imperforate outer casing 17 is fitted with a neck 18 into which a centrally disposed perforate tube 19 extends, for centering purposes and easy assembly. Pairs of transverse headers 20 of perforate metal are welded to the tube 19. The outer peripheries of the headers 20 are closed by short shells 21, preferably of perforate metal in order to confine the sound absorbing material during assembly and to prevent acoustic leaks which might exist were imperforate metal used. Perforate shells 22 extend between adjacent pairs of headers 20; thus forming annular cavities, which, together with the space between the transverse headers 20, are filled with sound absorbing material 23. In the case of semi-self-supporting sound absorbing material such as certain grades of hair felt, it is not always necessary to confine it between perforate members.

Fig. 9 shows how hair felt 24 may be supported by a single tubular member 25 and single transverse perforate members 26, the felt being sewn and/or bound to the perforate metal in any convenient manner. The perforate metal used should have as large a percentage of open space as is compatible with the necessary strength.

Fig. 10 shows a commercial embodiment of the invention comprising a plurality of similar sections, each section being similar to that shown in Fig. 4. For best performance, the transverse headers 27 are made of laminated construction, to avoid spurious coupling between adjacent sections. Since in the present invention, I have shown how to avoid loss of attenuation due to parasitic resonance conditions in the sidebranches, there is no need to make the sections of the device of Fig. 10 dissimilar. A sufficient number of sections is used to provide the necessary attenuation. The useful range of frequencies may be extended in the direction of low frequencies most conveniently by making the sections of large diameter, other things being equal.

In recapitulation, the pervious partitions of sound absorbing material function in a wholly novel manner as employed in my invention. They are so disposed that they present a surface which is normal, at points of greatest acoustic velocity, to those sound waves which nullify to a certain extent the proper action of the device and which have been referred to above as parasitic oscillations. At the same time, the pervious partitions are in a sense tangent to those sound waves entering and leaving the sidebranch in a direction normal to the main sound conducting channel. These latter waves are those involved in the proper functioning of the device and it is not desirable to disturb the manner in which they are acted upon in accordance with the invention described in my Patent 2,043,731. If the pervious partitions are omitted the parasitic oscillations set up produce an effect similar to permitting sound waves to enter at one end of the sidebranch, travel along it, and re-enter the main channel at the other end of the sidebranch.

I prevent such parasitic longitudinal resonance and so prevent loss of attenuation by this "short-circuiting," permitting the device to function in a proper manner after the elementary theory I disclosed in the above named patent. Since the pervious partitions are tangent to the direction of the waves entering the sidebranch in a direction normal to the main channel, they exert practically no effect upon them. Furthermore, for the waves leaving the main channel at right angles thereto substantially equal phase conditions obtain on either side of a given partition; wherefore there is no tendency to create an acoustic velocity in a direction normal to the surface of the partitions. It is only when the desired action is interfered with by what I have termed parasitic effects that the pervious partitions function and then in such a manner as to eliminate only such undesired resonance effects. In other words, the attenuation for a sound frequency of, say, three times the fundamental longitudinal resonance frequency of the annular side-branch cavity will not suffer by reason of longitudinal resonance in this cavity since there is at least one body of sound absorbing material positioned therein at a region of what would be high acoustic velocity were the pervious partitions not present. Still another way of expressing this is to say that the acoustic impedance for the parasitic oscillations is greatly increased without materially increasing the acoustic impedance for the waves entering the sidebranch in a direction normal to the axis of the main channel.

While it is theoretically possible to have circumferential standing waves in an annular sidebranch, such a system in the sidebranches of my invention is unlikely since, as far as oscillations of this type are concerned, all points of the periphery are excited in phase. Furthermore, the comparatively great difference in diameter between the outer shell and inner concentric layer of sound absorbing material mitigates against there being any well-defined system in which such oscillations may exist. Thus, longitudinal pervious partitions disposed in various radial planes are generally unnecessary but may be used if desired.

I claim:

1. An acoustic silencing device comprising a main sound conducting channel, a closed cavity acoustically coupled to the main sound conducting channel through a body of sound absorbing material, and one or more pervious partitions of sound absorbing material positioned in said cavity at points intermediate the length thereof and extending transversely to said channel.

2. An acoustic silencing device comprising a main sound conducting channel, an acoustic sidebranch acoustically coupled thereto, and means within the sidebranch for increasing the acoustic impedance thereof in one direction without materially increasing its acoustic impedance in another direction at an angle thereto.

3. An acoustic silencing device comprising a main sound conducting channel, an acoustic sidebranch having a substantial extent in the direction of the main sound conducting channel and acoustically coupled to said main channel through a pervious body of sound absorbing material substantially throughout said extent, and means within the sidebranch for increasing the acoustic impedance thereof in the direction of the main sound conducting channel without materially increasing its acoustic impedance in a direction normal to the main sound conducting channel.

4. An acoustic silencing device comprising a main sound conducting channel, an acoustic sidebranch having a substantial extent in the direction of the main sound conducting channel and acoustically coupled to said main channel through a pervious body of sound absorbing material substantially throughout said extent, and one or more bodies of sound absorbing material positioned within said sidebranch at points of high acoustic velocity for sound waves traveling within said sidebranch in a direction parallel to the main sound conducting channel.

5. An acoustic silencing device comprising a main sound conducting channel, an acoustic sidebranch having a substantial extent in the direction of the main sound conducting channel and acoustically coupled to said main channel through a pervious body of sound absorbing material substantially throughout said extent, and one or more pervious partitions of sound absorbing material extending across said sidebranch in a direction normal to waves traveling within said sidebranch parallel to the direction of the main sound conducting channel, said partitions being located at points of high acoustic velocity for said sound waves.

6. An acoustic silencing device comprising a main sound conducting channel, an acoustic sidebranch having a substantial extent in the direction of the main sound conducting channel and acoustically coupled to said main channel through a pervious body of sound absorbing material substantially throughout said extent, and one or more pervious partitions of sound absorbing material extending across said sidebranch in a direction normal to waves traveling within said sidebranch parallel to the direction of the main sidebranch parallel to the direction of the main sound conducting channel, said partitions being located within the sidebranch at antinodal points for standing wave systems parallel to the direction of the main sound conducting channel.

7. An acoustic silencing device comprising a main sound conducting channel, an acoustic sidebranch having a substantial extent in the direction of the main sound conducting channel and acoustically coupled to said main channel through a pervious body of sound absorbing material substantially throughout said extent, and two pervious partitions of sound absorbing material extending across said sidebranch in a direction normal to sound waves traveling within said sidebranch parallel to the direction of the main sound conducting channel, said partitions being located respectively at the longitudinal center and the longitudinal quarter point of said sidebranch.

8. An acoustic silencing device comprising a main sound conducting channel, a plurality of acoustic sidebranches ranged along the main channel, each of the sidebranches being acoustically separate from those adjacent to it, each sidebranch having a substantial extent in the direction of the main sound conducting channel and being acoustically coupled to said main channel through a pervious body of sound absorbing material substantially throughout said extent, and having one or more pervious partitions of sound absorbing material extending across said sidebranch in a direction normal to waves traveling within said sidebranch parallel to the direction of the main sound conducting channel and located at points of high acoustic velocity for said sound waves within said sidebranch.

9. An acoustic silencing device comprising a closed casing, a pervious conduit extending centrally through the casing and forming a main sound conducting channel, an annular layer of pervious sound absorbing material surrounding the conduit and forming an acoustic coupling between the main sound conducting channel and the space within the closed casing, and pervious partitions of sound absorbing material extending between said annular layer to the inside of the casing at points of high acoustic velocity for sound waves in said space traveling in a direction parallel to the main sound conducting channel.

10. An acoustic silencing device comprising a closed casing, a pervious conduit extending centrally through the casing and forming a main sound conducting channel, an annular layer of pervious sound absorbing material surrounding the conduit and forming an acoustic coupling between the main sound conducting channel and the space within the closed casing, and a pair of pervious partitions of sound absorbing material extending between said annular layer and the inside of the casing, said partitions being located respectively at the longitudinal center and the longitudinal quarter point of said casing.

11. An acoustic silencing device comprising a casing having end headers and inlet and outlet conduits, a pervious conduit extending centrally through the casing and received within said inlet and outlet conduits, pervious metallic partitions arranged in pairs and secured to the conduit so as to extend outwardly to the inside of the casing, pervious cylindrical members joining said pairs of partitions and the space between said partitions and the end headers, and sound absorbing material between said partitions and between the conduit and the cylindrical members, the composite partitions comprising the pervious metallic partitions and the sound absorbing material between them being positioned at points of high acoustic velocity for sound waves in the space between the cylindrical members and the casing traveling in a direction parallel to the pervious conduit.

12. An acoustic sidebranch comprising a closed cavity having intermediate its bounding surfaces a pervious partition of sound absorbing material, the thickness of said partition being small compared to the greatest linear dimension of said closed cavity.

13. An annular acoustic sidebranch having a plurality of transverse pervious partitions of sound absorbing material positioned at points intermediate its length, the total thickness of said partitions being small compared to the axial length of said annular sidebranch.

14. A non-resonant acoustic cavity having bodies of sound absorbing material localized therein at points removed from the bounding surfaces of said cavity.

15. A closed acoustic sidebranch rendered incapable of exhibiting parasitic resonance phenomena by means of relatively thin partitions of pervious sound absorbing material disposed therein at points of high acoustic velocity.

16. An annular acoustic sidebranch having a plurality of transverse pervious partitions of sound absorbing material positioned at points intermediate its length.

17. A closed acoustic sidebranch comprising means forming the bounding surfaces of a closed cavity, and a pervious partition of sound absorbing material positioned within said cavity intermediate and separated from its bounding surfaces.

18. A closed acoustic sidebranch comprising means forming the bounding surfaces of a closed cavity, and a pervious partition of sound absorbing material positioned within the cavity at a region of high acoustic velocity for standing wave systems occurring within the cavity.

19. A sound attenuating device comprising a sound conducting channel, an acoustic sidebranch acoustically coupled to said channel and capable of having more than one system of sound waves excited therein by sound waves occurring in the channel, and means within said sidebranch for highly attenuating one of said systems without materially attenuating another of said systems.

20. A sound attenuating device comprising a sound conducting channel, an annular acoustic sidebranch surrounding the channel and acoustically coupled thereto, and means for preventing standing waves in the sidebranch parallel to the axis thereof comprising at least one body of sound absorbing material localized therein at a region of high acoustic velocity.

21. A sound attenuating device comprising a sound conducting channel, an annular acoustic side branch surrounding the channel and acoustically coupled thereto, and means for preventing standing waves in the sidebranch parallel to the axis thereof comprising at least one pervious partition of sound absorbing material positioned within said sidebranch substantially at right angles to said axis and in a region of high acoustic velocity only.

22. A sound attenuating device comprising a main sound conducting channel and a plurality of adjacent closed cavities each coupled to the main sound conducting channel through a body of sound absorbing material, the cavities being separated one from another by partitions of foraminous material.

23. A sound attenuating device comprising a main sound conducting channel and a plurality of adjacent closed cavities each coupled to the main sound conducting channel through a body of sound absorbing material, the cavities being separated one from another by partitions comprising sound absorbing material.

24. An acoustic silencer comprising a main sound conducting channel, a walled chamber having a substantial length along the main channel and acoustically coupled thereto in a zone distributed along said length, and one or more transverse pervious partitions of sound absorbing material located within the chamber intermediate the coupling zone, the total thickness of the partitions being substantially less than the length of the chamber.

25. An acoustic silencer comprising a main sound conducting channel, a walled chamber having a substantial extent along the main channel and acoustically coupled to the channel in a zone extending substantially throughout said extent, and a pervious partition of sound absorbing material disposed within the chamber transversely to the main channel and intermediate the zone of coupling.

26. An acoustic silencer comprising a main sound conducting channel, a walled chamber having a substantial length along the main channel and acoustically coupled thereto in a zone distributed substantially throughout the length of the chamber, and a pervious partition of sound absorbing material disposed within the chamber transversely to the main channel and intermediate the zone of coupling, the sound absorbing material having sufficient thickness to prevent the formation of standing wave systems within the chamber and in the direction of extent of the main channel but thin enough to permit the passage of sound waves therethrough.

27. An acoustic silencer comprising a main sound conducting channel, a walled cavity forming a sidebranch and having a substantial extent along the main channel, means for coupling the sidebranch to the main channel including a body of sound absorbing material, and a second body of sound absorbing material located within the sidebranch intermediate the length of the sidebranch.

28. An acoustic silencer comprising a main sound conducting channel, a walled cavity forming a sidebranch and having a substantial extent along the main channel, means for coupling the sidebranch to the main channel including a body of sound absorbing material, and one or more additional bodies of sound absorbing material located within the sidebranch so as to divide the sidebranch into sections along the direction of extent of the channel, said additional bodies of sound absorbing material being of sufficient thickness to prevent the formation of standing wave systems within the sidebranch and in the direction of extent of the main channel but thin enough to permit the passage of sound waves therethrough.

29. An acoustic silencer comprising a main sound conducting channel, a walled cavity forming a sidebranch and having a substantial extent along the main channel, the wall of the cavity adjacent the main channel being formed to provide a coupling between the main channel and said sidebranch, pervious sound absorbing material forming at least part of said coupling, and a localized body of sound absorbing material positioned within the middle third of the extent of the sidebranch in the direction of the main channel and positioned with its major surfaces substantially tangent to sound waves entering the sidebranch from the main channel and substantially normal to sound waves extending along the sidebranch in the direction of the main channel, the thickness of the material being substantially less than a third of the length of the sidebranch.

ROLAND B. BOURNE.

CERTIFICATE OF CORRECTION.

Patent No. 2,271,892.　　　　　　　　　　　　　February 3, 1942.

ROLAND B. BOURNE.

It is hereby certified that error appears in the printed specification of the above numbered patent requiring correction as follows: Page 2, first column, line 50, after the word "partitions" insert --are--; line 67, for "prevent" read --present--; and second column, line 75, for "large" read --larger--; page 3, first column, line 32, for "there, to" read --thereto,--; and that the said Letters Patent should be read with this correction therein that the same may conform to the record of the case in the Patent Office.

Signed and sealed this 24th day of March, A. D. 1942.

Henry Van Arsdale,
Acting Commissioner of Patents.

(Seal)